United States Patent
Christ et al.

(10) Patent No.: US 11,920,683 B2
(45) Date of Patent: Mar. 5, 2024

(54) VALVE ARRANGEMENT AND FLUID FLOW CONTROL ELEMENT

(71) Applicant: Siemens Energy Global GmbH & Co. KG, Bayern (DE)

(72) Inventors: Martin Christ, Petersaurach (DE); Mathias Stark, Heidenheim (DE)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 375 days.

(21) Appl. No.: 17/257,123

(22) PCT Filed: Jun. 28, 2019

(86) PCT No.: PCT/EP2019/067340
§ 371 (c)(1),
(2) Date: Dec. 30, 2020

(87) PCT Pub. No.: WO2020/007728
PCT Pub. Date: Jan. 9, 2020

(65) Prior Publication Data
US 2021/0156482 A1 May 27, 2021

(30) Foreign Application Priority Data

Jul. 5, 2018 (DE) .................... 10 2018 211 102.2

(51) Int. Cl.
*F16K 1/36* (2006.01)
*F01D 17/14* (2006.01)
(Continued)

(52) U.S. Cl.
CPC .............. *F16K 1/36* (2013.01); *F01D 17/145* (2013.01); *F16K 3/267* (2013.01); *F16K 25/00* (2013.01);
(Continued)

(58) Field of Classification Search
CPC . F16K 1/36; F16K 3/267; F16K 25/00; F16K 27/02; F16K 31/02; F16K 31/12;
(Continued)

(56) References Cited

U.S. PATENT DOCUMENTS 1,122,928 A * 12/1914 Hodges ..................... F16K 3/26
  91/271
1,807,446 A   5/1931 Smeby
(Continued)

FOREIGN PATENT DOCUMENTS

CN  107387786 A  * 11/2017
DE  1911522 A1    9/1970
(Continued)

OTHER PUBLICATIONS

DE1911522a1, Weisheit, Machine Translation (Year: 1969).*
(Continued)

*Primary Examiner* — Daphne M Barry
(74) *Attorney, Agent, or Firm* — Wolter Van Dyke Davis, PLLC

(57) ABSTRACT

A valve arrangement for a steam turbine, wherein, for regulating a fluid flow, the valve arrangement has a hollow cylindrical valve body, which cooperates with a corresponding valve seat. The valve body has a linear contact edge and has multiple compensating bores for pressure equalization. The valve body is moved electromechanically via a coupling element into a stationary element. In addition, the valve arrangement has a housing having a curvature, which extends in the direction of the valve body.

18 Claims, 3 Drawing Sheets

(51) Int. Cl.
*F16K 3/26* (2006.01)
*F16K 25/00* (2006.01)
*F16K 27/02* (2006.01)
*F16K 31/02* (2006.01)
*F16K 31/12* (2006.01)
*F16K 39/02* (2006.01)
*F16K 39/04* (2006.01)

(52) U.S. Cl.
CPC .............. *F16K 27/02* (2013.01); *F16K 31/02* (2013.01); *F16K 31/12* (2013.01); *F16K 39/04* (2013.01); *F05D 2220/31* (2013.01); *F05D 2230/80* (2013.01); *F16K 39/02* (2013.01)

(58) Field of Classification Search
CPC ...... F16K 39/04; F16K 39/02; F05D 2220/31; F05D 2230/80; F01D 17/145
See application file for complete search history.

(56) References Cited

U.S. PATENT DOCUMENTS

| | | | | |
|---|---|---|---|---|
| 2,091,669 | A * | 8/1937 | Bryant | F01D 17/145 251/28 |
| 2,633,857 | A * | 4/1953 | MacDonald | F01D 17/145 251/282 |
| 4,766,932 | A * | 8/1988 | Heymann | F01D 17/145 251/282 |
| 5,277,403 | A * | 1/1994 | Waggott | F01D 17/145 251/324 |
| 5,427,147 | A * | 6/1995 | Henriksson | F16K 47/08 137/625.37 |
| 6,030,174 | A | 2/2000 | Maier | |
| 11,092,260 | B2 * | 8/2021 | Zhou | F16K 47/08 |
| 2006/0283503 | A1 | 12/2006 | McCausland | |
| 2012/0240580 | A1 | 9/2012 | Takemaru | |
| 2014/0014865 | A1 | 1/2014 | Anderson | |
| 2015/0204215 | A1 * | 7/2015 | Chowdhury | F16K 1/42 251/368 |

FOREIGN PATENT DOCUMENTS

| | | |
|---|---|---|
| DE | 102016205454 A1 | 10/2017 |
| EP | 0075209 A2 | 3/1983 |
| EP | 2503105 A2 | 9/2012 |
| EP | 2872802 A1 | 5/2015 |
| JP | 2010112539 A | 5/2010 |

OTHER PUBLICATIONS

CN107387786a, Dia, Machine Translation (Year: 2017).*
PCT International Search Report and Written Opinion of International Searching Authority dated Oct. 22, 2019 corresponding to PCT International Application No. PCT/EP2019/067340 filed Jun. 28, 2019.

* cited by examiner

VALVE ARRANGEMENT AND FLUID FLOW CONTROL ELEMENT

CROSS REFERENCE TO RELATED APPLICATIONS

This application is the US National Stage of International Application No. PCT/EP2019/067340 filed 28 Jun. 2019, and claims the benefit thereof. The International Application claims the benefit of German Application No. DE 10 2018 211 102.2 filed 5 Jul. 2018. All of the applications are incorporated by reference herein in their entirety.

FIELD OF INVENTION

The present invention relates to a valve arrangement. Furthermore, the present invention relates to a fluid flow control element comprising a valve arrangement according to the invention. Furthermore, the present invention relates to a turbomachine system comprising a valve arrangement and/or a fluid flow control element. Furthermore, the present invention relates to a method for the provision or repair of a turbomachine system comprising a valve arrangement and/or fluid flow control element. Furthermore, the present invention relates to the use of a valve arrangement or of a fluid flow control element.

BACKGROUND OF INVENTION

Turbomachine systems are an important constituent part of modern industry and are of particular significance, for example, in the case of energy generation. Here, turbomachine systems of this type have passed through a wide variety of developments. Well-established systems such as steam turbine systems are also constantly a subject of developments and are subjected to new requirements. For example, new challenges such as the equalization of fluctuating feeds of renewable energy sources such as wind energy and solar energy or else tightened requirements with regard to work safety and increased cost pressure result in a constant requirement also for ever further optimization of systems of this type.

Here, for example, there is the desire for a regulating system of the fluid flow of the turbomachine systems, which regulating system can be regulated simply and is easier to maintain. Here, at the same time, the safety, in particular for the coworkers, has to be at least maintained, however. An improvement is advantageously also to be achieved here. This is of particular significance for systems such as the steam turbine systems, in the case of which a fluid flow under high pressure is used. At the same time, the system is to be as reliable and low in maintenance as possible, however; a high manufacturing complexity resulting in high spare parts costs and increased risk of production defects is also to be minimized as far as possible.

SUMMARY OF INVENTION

Said objects are achieved by way of the apparatuses, the method and the use, as described herein and indicated in the claims. The dependent claims and further description contain advantageous refinements of the invention which provide further advantages which can also solve additional problems.

According to one aspect, the present invention relates to a valve arrangement for the regulation of a fluid flow comprising a stationary element and a movable element, the stationary element having a cavity, in which the movable element moves, the movable element being suitable for being moved translationally along a first axis within the cavity of the stationary element, the movable element comprising a piston element and a rod-shaped coupling element, the piston element having an outer side parallel to the first axis, the valve arrangement being designed in such a way that a throughflow of the fluid flow between the stationary element and the outer side of the piston element is prevented, the piston element having a contact edge which is suitable for making contact with a valve seat, the piston element having a rear side opposite the contact edge, the coupling element being fastened to the rear side of the piston element.

According to a further aspect, the present invention relates to a fluid flow control element comprising a valve arrangement according to the invention, a fluid flow line and a fluid flow inlet opening comprising a valve seat within the fluid flow line, the valve seat being suitable for making contact with the contact edge of the valve arrangement.

According to a further aspect, the present invention relates to a turbomachine system comprising at least one valve arrangement according to the invention and/or a fluid flow control element according to the invention.

According to a further aspect, the present invention relates to a method for providing or repairing a turbomachine system, advantageously a steam turbine system, the method comprising the installation or the repair of a valve arrangement according to the invention or of a fluid flow control element according to the invention.

According to a further aspect, the present invention relates to the use of a valve arrangement according to the invention or of a fluid flow control element according to the invention for the regulation of the fluid flow of a turbomachine system, advantageously a steam turbine system. Within the context of the present invention, the term "regulation" denotes the setting of a desired fluid flow and, in particular, the blocking of the fluid flow.

For a more complete understanding of the present invention, reference is made to the following detailed description and the figures which are described in conjunction therewith. Here, however, the figures are to be understood only as a clarification of the invention, and represent only particularly advantageous embodiments and not a restriction of the invention.

DETAILED DESCRIPTION OF INVENTION

According to one aspect, the present invention relates to the abovementioned valve arrangement.

Figure 3:
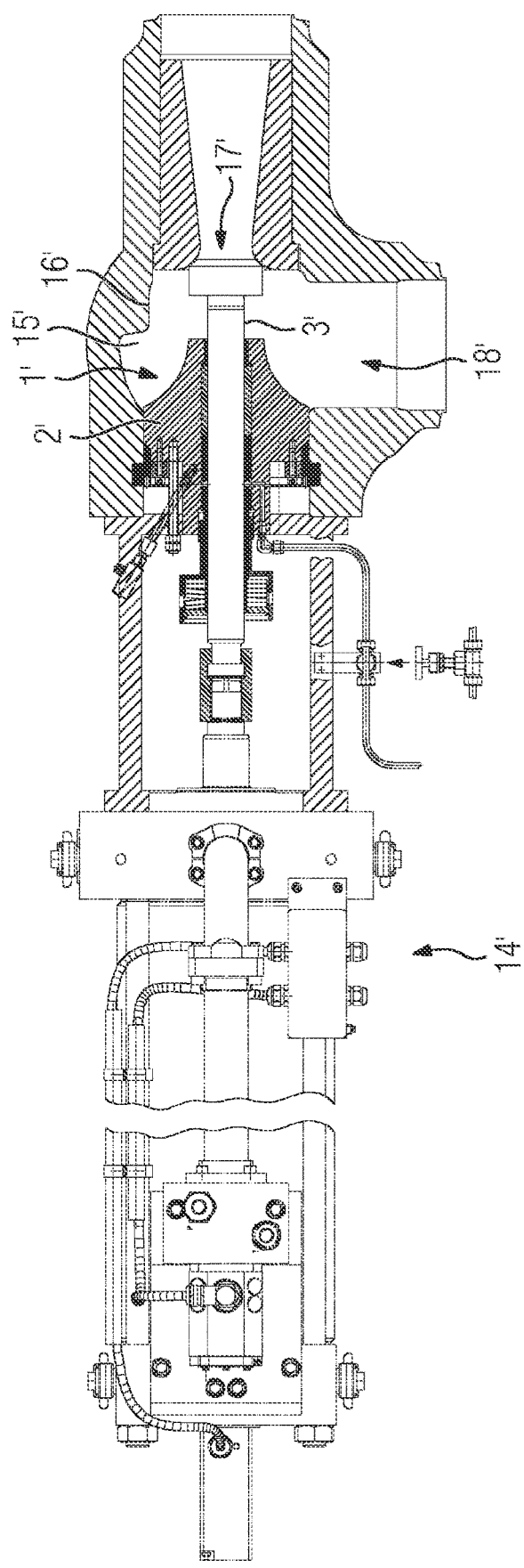
FIG. 3 shows a diagrammatic cross section of a similar fluid flow control element with a customary valve arrangement as a side view.

Said valve arrangements permit the control of a fluid flow, in particular of a turbomachine system such as a steam turbine system, with the use of merely very low actuating forces. It has surprisingly been shown that the required actuating force can be reduced by means of the valve arrangement according to the invention, even in the case of regulation of high pressures of the fluid flow such as, for example, more than 100 bar, for example 150 bar, by more than 90% with respect to known systems, as in the case of the use of a known valve arrangement as illustrated in FIG. 3. This is attributed to the fact that, in contrast to existing valve arrangements, the pressure of the fluid flow cannot act on the rear side of the piston element. The valve arrangement is advantageously designed in such a way that the piston element is situated at least partially within the cavity of the stationary element even in the case of a closed position of the valve. Within the context of the present invention, "closed position" is understood to mean that the contact edge is in contact with the valve seat. Although embodiments with, for example, additionally separate chambers are also conceivable, this typically increases merely the device requirements without a significant improvement. Here, the embodiment with prevention of a throughflow between the outer side of the piston element and the stationary element prevents that the fluid flow flows to the rear side of the piston element in an otherwise uncontrolled way and therefore, in particular, makes the opening of the valve possible only with the use of very great actuating forces. Here, even a seemingly delicate construction such as the embodiment which is indicated in the following text, in the case of which the piston element is embodied in a pot shape which is open toward the contact edge side, can surprisingly provide not only reliable regulation, but rather also extraordinary long-term stability.

This allows the use of drive elements with drastically reduced requirements even in highly loaded regions, for example in the case of turbomachine systems such as steam turbine systems. Here, in particular, simple electromechanical drive elements can be used which provide exact regulation, simple replacement, considerably reduced operating costs, maintenance costs and procurement costs, and increased operational safety. Even the use of, for example, hydraulic or pneumatic drive elements which are designed for said considerably lower actuating forces still has considerable advantages in comparison with the use of high pressure hydraulics which, for example, are used at the current time.

At the same time, it has been shown surprisingly that the valve arrangement according to the invention has a considerably increased reliability with a simultaneously decreased manufacturing complexity in comparison with solutions such as double seat valves which have problems, for example, with regard to the provision of the required seal and at the same time entail a very high manufacturing complexity. This applies, in particular, to highly loaded uses as in the feed line regions of the fluid flow to the turbine unit in the case of turbomachine systems. Here, an example which can be mentioned is, in particular, the steam turbine systems, in the case of which a high pressure has to be regulated safely.

In the following text, some embodiments of the present invention which provide further specific advantages will be described by way of example. The subjects of said embodiments can also be combined with one another in any desired manner, in order to provide particularly advantageous embodiments for specific applications.

In the case of further embodiments, it is advantageous that the rear side has at least one passage, the at least one passage connecting the region behind the rear side and the opposite region within the contact edge. This allows a particularly simple pressure equalization on both sides. Since, for example, a pressure equalization with the space outside the fluid flow line is not required, this is therefore a closed system, which further increases the operational safety.

In the case of further embodiments, it is advantageous that the piston element has a pot shape which is open on the side of the contact edge with a side wall, the piston element having a rear wall opposite the contact edge, the rear wall having at least one passage. As a result, it becomes possible for the weight of the piston element to be reduced considerably, the valve arrangement surprisingly still being reliable enough for the use even in highly loaded cases as in the steam lines of a steam turbine system, for example between the steam generator and the steam turbine. Corresponding valve arrangements have surprisingly been shown to be typically superior, in particular with regard to their wear over a relatively long period of use.

In the case of further embodiments, it is advantageous that the piston diameter is at least 75% of the valve seat diameter, more advantageously at least 85% of the valve seat diameter, even more advantageously at least 90% of the valve seat diameter. In this way, in particular, compact fluid flow control elements can be realized.

In the case of further embodiments, it is advantageous that the piston diameter is at most 99.5%, more advantageously at most 99%, of the valve seat diameter. Surprisingly, it typically proves to be advantageous for the region of the contact edge to be widened; improved contact between the contact edge and the valve seat would be achieved.

In the case of further embodiments, it is advantageous that the contact edge is situated on a thickened portion of the piston element, advantageously a bead. In particular, it is advantageous that the thickened portion extends at least partially away from the first axis. By way of the provision of a thickened portion of this type, for example, an action surface for the fluid flow can be provided, which action surface exerts an additional pressure in the closed position of the valve and holds the valve closed. This is advantageous, for example, should the coupling element fracture or a securing means of the position of the movable element fail during the replacement of the drive.

In the case of further embodiments, it is advantageous that the outer side of the piston element has at least one seal, more advantageously at least two seals, the seal advantageously being selected from the group consisting of labyrinth seals such as see-through labyrinth seals, piston rings and brush seals, more advantageously from the group consisting of labyrinth seals such as see-through labyrinth seals and piston rings. In particular, it is typically advantageous if the outer side of the side wall and/or that inner side of the cavity which lies opposite the outer side of the side wall, advantageously the outer side of the side wall, have/has at least one labyrinth seal and at least one piston ring. Here, labyrinth seals can be configured in various forms. For example, they can either protrude from the relevant surface or can be present in the form of milled slots in the relevant surface. For applications of high pressures of the fluid flow such as, for example, in the case of steam turbine flow systems, it has typically proved advantageous for the labyrinth seal to be configured in the form of milled slots of the surface.

Corresponding milled slots for labyrinth seals are typically produced particularly simply, substantially perpendicularly with respect to the corresponding surface. A milled slot of this type can of course also be angled, however. Corresponding milled slots advantageously have an angle of from 45° to 135°, more advantageously an angle of from 55° to 125°, even more advantageously an angle of from 80° to 100°, in relation to the corresponding surface, in which the milled slots are made.

In particular, it is typically advantageous if the outer side of the side wall and/or that inner side of the cavity which lies opposite the outer side of the side wall, advantageously the outer side of the side wall, have/has at least one labyrinth seal and at least one piston ring. Even a labyrinth seal of this type is typically sufficient to keep the leakage below an acceptable limit value even, for example, in the case of highly loaded applications as in steam feed lines to the turbine in the case of steam turbine systems. The combination with, for example, a piston ring for the further reduction and securing allows not only the leakage to be reduced further, but rather also the reliability to be increased further.

It is typically advantageous that the piston element has a round shape. In particular, it is typically advantageous that the cross section of the piston element perpendicular with respect to the first axis is oval or circular, more advantageously circular. Although other shapes such as rectangular, square or triangular, in particular with rounded edges, are also conceivable, round shapes of this type have proven to be particularly advantageous for the present case, since they can be sealed excellently and are simple to produce.

In the case of further embodiments, it is advantageous that a stuffing box packing is arranged between the coupling element and the stationary element. The stuffing box packing provides particularly reliable sealing against, for example, the exit of steam from the valve arrangement or the entry of atmosphere into the valve arrangement. Here, various rings and/or bushings are advantageously combined, in order to achieve highly durable and nevertheless reliable sealing. In particular, the rings and/or bushings advantageously consist at least partially, more advantageously at least 50% thereof in relation to their number, more advantageously completely, of graphite and/or stainless steel.

In the case of further embodiments, it is advantageous that the coupling element is coated at least partially, more advantageously in the region of the stuffing box packing, with a hard coating. A coating of this type can be provided, for example, by way of detonation spray coating, laser deposition welding, nitriding, plasma spraying, low temperature plasma coating, flame spraying or combinations thereof, more advantageously detonation spray coating, laser deposition welding, nitriding, plasma spraying or combinations thereof, even more advantageously detonation spray coating, laser deposition welding or combinations thereof. A particularly advantageous coating method is detonation spray coating. Particularly durable coatings can be achieved by way of this.

In the case of further embodiments, it is advantageous that the stationary element has an injection channel in the region of the stuffing box packing. An injection channel of this type can be used, for example, in order to spray in a sealing compound, such as graphite paste, and carry out an emergency repair. This is a very advantageous additional safeguard for further increasing the reliability and safety of the valve arrangement.

In the case of further embodiments, it is advantageous that the coupling element has a fastening element, the fastening element being suitable for being fastened to an electromechanical drive releasably or non-releasably, advantageously releasably. Examples of the fastening element can be selected from the group consisting of indentations, bulges, threads for fastening screw connections, and cavities for fastening by means of cylindrical pins. For example, the end of the coupling element can be configured as a hammer head, the electromechanical drive being connected releasably to the hammer head end of the coupling element for the transmission of the translational movement via a suitable counterpart.

In the case of many embodiments, it is typically advantageous that the connection between the drive and the movable element takes place in a non-positive or positively locking manner, more advantageously in a positively locking manner. Although a non-positive connection also achieves very satisfactory results, the positively locking connection has been shown to be an advantageous connection type, in particular, for typical applications, in order to provide high reliability, it also being possible, however, for the connection to be released again rapidly, in order to replace the drive, for example.

In the case of further embodiments, it is advantageous that the rear side or the rear wall has at least two passages, more advantageously at least three passages, even more advantageously at least four passages. It is typically advantageous that the passages are arranged symmetrically on the rear side or the rear wall. The use of a plurality of passages has proven to be advantageous, in particular, since a more homogeneous flow of the fluid through the piston element or the rear wall is apparently achieved by way of this, and the movement of the movable element can take place in an even more homogeneous manner even if the movement is to take place very rapidly. This is particularly advantageous, for example, for applications such as the use as a main valve or else as a valve in the fluid flow line of a steam turbine system between the steam generator and the steam turbine.

In the case of further embodiments, it is advantageous that the contact edge is rounded and is suitable for providing a linear contact with the valve seat. Here, particularly reliable sealing is typically achieved if the fluid flow is to be stopped completely. A rounded portion of this type can be seen clearly, for example, in a cross section along the first axis.

According to a further aspect, the present invention relates to a fluid flow control element comprising a valve arrangement according to the invention, a fluid flow line and a fluid flow inlet opening comprising a valve seat within the fluid flow line, the valve seat being suitable for making contact with the contact edge of the valve arrangement. A fluid flow control element of this type is advantageously used in a turbomachine system. Here, it is advantageous, in particular, that the fluid flow which is controlled here is utilized by the turbomachine for energy generation. Surprisingly, the fluid flow control elements according to the invention are also suitable for the extremely high requirements of the control of the fluid flow which is used as an energy carrier in a turbomachine system. For example, the fluid flow control element according to the invention can particularly advantageously be installed in the fluid flow line upstream of the turbine of the turbomachine.

In the case of further embodiments, it is advantageous that the fluid flow line has a piston space in the region of the valve arrangement, the piston space having an indentation, the indentation extending in the direction of the movable element. It has been observed here that an inhomogeneous shape of this type of the piston space surprisingly makes a movement of the movable element possible, which movement is controlled in an even more improved manner.

It is typically advantageous that the indentation narrows the spacing between the piston space and the outer side of the piston element to less than 75%, more advantageously less than 65%, even more advantageously to less than 55%, of the average spacing between the piston space and the outer side of the movable element, in relation to the cross section perpendicularly with respect to the first axis through the center of the part of the movable element which protrudes out of the cavity of the stationary element in the closed position. This surprisingly results in a stabilization of the movable element, as a result of which its wear is reduced significantly.

In the case of further embodiments, it is advantageous that the indentation extends over at least 3%, more advantageously at least 5%, even more advantageously at least 7%, of the piston space, in relation to the cross section perpendicularly with respect to the first axis through the center of the part of the movable element which protrudes out of the cavity of the stationary element in the closed position. In particular for applications in the case of fluid flows at high pressure such as, for example, steam flows in steam turbine systems, it has proven advantageous for the indentation to not be of too small a design. Here, in particular, a high reliability is achieved.

In the case of further embodiments, it is advantageous that the indentation extends over at most 20%, more advantageously at least 17%, even more advantageously at least 15%, of the piston space, in relation to the cross section perpendicularly with respect to the first axis through the center of the part of the movable element which protrudes out of the cavity of the stationary element in the closed position. It has also been shown that excessively large dimensioning of the indentation typically does not bring about an improvement. In individual cases, the positive effect which is achieved by means of the indentation can even be reduced again as a result.

In the case of further embodiments, it is advantageous that the fluid flow control element comprises an electromechanical drive which is connected releasably or non-releasably, advantageously releasably, to the coupling element of the movable element, and the electromechanical drive being suitable for moving the movable element along the first axis. In particular, the releasable connection to an easily exchangeable electromechanical drive surprisingly allows a rapid and safe exchange of the drive, even during operation.

According to a further aspect, the present invention relates to a turbomachine system comprising at least one valve arrangement according to the invention and/or a fluid flow control element according to the invention.

In the case of further embodiments, it is advantageous that the turbomachine system is a steam turbine system. For example, the high steam pressure which is typically used here results in particularly high necessary actuating forces for the regulation of a customary valve, as a result of which turbomachine systems of this type profit especially from the valve arrangements and fluid flow control elements according to the invention.

In the case of further embodiments, it is advantageous that the valve arrangement and/or the fluid flow control element are/is arranged in the steam line between the steam generator and the steam turbine. Since there are typically the highest steam pressures here, the advantages according to the invention prove to be particularly great.

In the case of further embodiments, it is advantageous that the valve arrangement and/or the fluid flow control element are/is a constituent part of the main shut-off means. In particular, it is typically advantageous that the valve arrangement and/or the fluid flow control element act here as a quick action valve. Since lower forces have to be applied here and at the same time a high reliability is achieved, the use at this location has proved to be particularly advantageous.

In the case of further embodiments, it is advantageous that the valve arrangement and/or the fluid flow control element are/is a constituent part of a release control valve. Here, for example, a part of the fluid flow can be removed, in order to be used, for example, for heating a preheater upstream of the steam generator. Here, for example, a part of the fluid flow can also be removed and used as process steam.

According to a further aspect, the present invention relates to a method for providing or repairing a turbomachine system, advantageously a steam turbine system, the method comprising the installation or the repair of a valve arrangement according to the invention or of a fluid flow control element according to the invention.

In the case of further embodiments, it is advantageous that the method comprises the at least partial replacement of an existing fluid flow control element comprising a high pressure hydraulic drive for the provision of a fluid flow control element according to the invention comprising a low pressure hydraulic drive or an electromechanical drive. The term "high pressure hydraulic drive" advantageously relates to a drive with at least 60 bar, more advantageously at least 80 bar, pressure. Furthermore, in the context of the present invention, the term "low pressure drive" also advantageously relates to a drive with a pressure of at most 30 bar, more advantageously at most 20 bar, even more advantageously at most 10 bar. In the case of upgrade methods of this type, particularly great improvements are achieved for typical applications.

In the case of further embodiments, it is advantageous that the method comprises the at least partial replacement of an existing fluid flow control element comprising a non-electromechanical drive with a fluid flow control element according to the invention comprising an electromechanical drive. As has already been described, the change of the drive system, which change is possible according to the present invention, in conjunction with the high reliability of the fluid flow control element provides a particularly advantageous combination for typical turbomachine systems such as, in particular, steam turbine systems.

According to a further aspect, the present invention relates to the use of a valve arrangement according to the invention or of a fluid flow control element according to the invention for the regulation of the fluid flow of a turbomachine system, advantageously a steam turbine system. Here, regulation is understood to mean, in particular, the setting of a desired steam pressure and, in particular, the blocking of the fluid flow. The valve arrangement according to the invention and the fluid flow control element according to the invention surprisingly allow not only reliable closure of the fluid flow line, but rather also a precise decrease or increase of the fluid flow. In combination with the electromechanical drive, in particular, this allows a rapid and precise regulation depending on the current requirements. Although a valve arrangement according to the invention or a fluid flow control element according to the invention can theoretically also be used for the regulation of a secondary fluid flow such as a hydraulic oil flow, it is particularly advantageously used for the regulation of the fluid flow which is used for the energy generation in a turbomachine. This proves to be particularly advantageous here.

Figure 1:
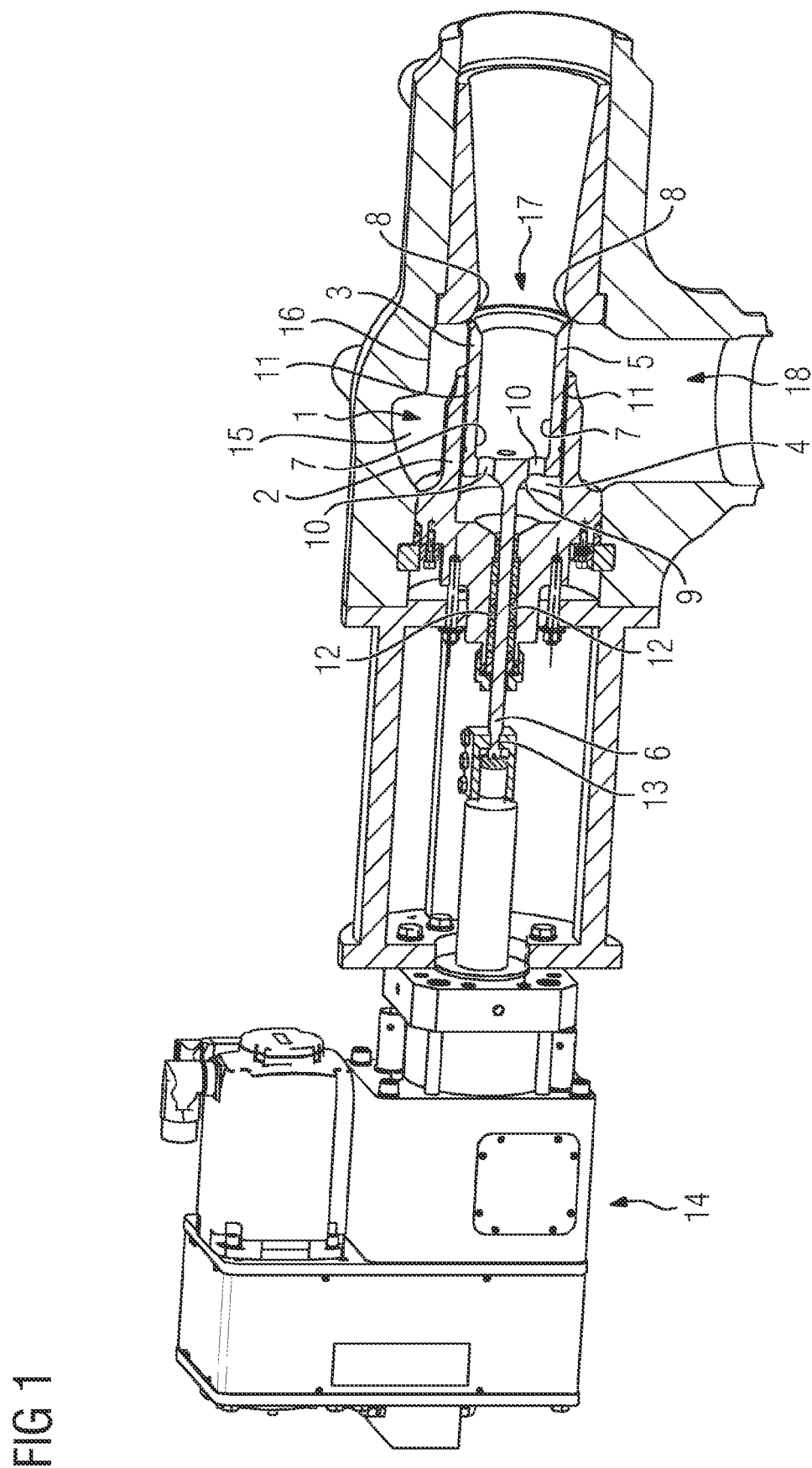
FIG. 1 shows a diagrammatic cross section of a fluid flow control element according to the invention as a side view.

FIG. 1 shows a diagrammatic cross section of a fluid flow control element according to the invention as a side view. The fluid flow control element comprises a valve arrangement 1, a fluid flow line 18 and a fluid flow inlet opening 17 within the fluid flow line 18. The fluid flow inlet opening 17 has a valve seat which is suitable for making contact with the contact edge 8 of the valve arrangement 1.

The fluid flow line 18 has a piston space 15 in the region of the valve arrangement 1. An indentation 16 is found in said piston space 15, the indentation 16 extending in the direction of the movable element 3.

The valve arrangement 1 serves for the regulation of the fluid flow which flows through the fluid flow line 18. In the case which is illustrated in FIG. 1, the fluid flow is a steam flow which is conducted from the steam generator of a steam turbine system as one example of the turbomachine system to the steam turbine.

The valve arrangement 1 comprises a stationary element 2 and a movable element 3, the stationary element 2 having a cavity 4, in which the movable element can move in a translational manner along a first axis.

The movable structure comprises a piston element 5 and a coupling element 6. The piston element 5 according to the embodiment which is illustrated in FIG. 1 is characterized by a cylindrical shape, the cylinder having a pot shape which is open on the side of the contact edge 8. The side wall 7 of the piston element 5 is delimited by way of the outer side of the piston element 5, which outer side extends parallel to the first axis and represents the shell surface of the cylinder. Here, the valve arrangement 1 is designed in such a way that a throughflow of the fluid flow between the stationary element 2 and the outer side of the piston element 5 is prevented. Since, as a result, the highly pressurized fluid flow cannot pass to the rear side of the piston element 5, the valve is relieved and can be moved by way of lower actuating forces. In order to prevent the throughflow of the fluid flow between the outer side and the stationary element 2 in an even more safe manner, the outer side of the piston element 5 has a labyrinth seal and a piston ring as seals 11. Said seals 11 are by definition found in that region of the outer side which is not moved out of the cavity 4 of the stationary element 2 even in the case of a closed position, in order that a throughflow of the fluid flow between the outer side and the stationary element 2 is prevented reliably.

Furthermore, the piston element 5 characterizes the contact edge 8 and the opposite rear wall 9. The contact edge 8 is rounded, in order to achieve a linear contact with the valve seat and to close the latter reliably. Furthermore, the contact edge 8 is situated on a bead of the piston element 5, as a result of which additional securing of the valve in the closed position takes place. The rear wall 9 has four passages which are arranged symmetrically around the connecting point of the rear side of the piston element 5 and the coupling element 6. This makes a pressure equalization of the region within the pot-shaped piston element 5 and the cavity 4 between the rear side of the piston element 5 and the stationary element 2 possible.

The coupling element 5 of the valve arrangement 1 is fastened centrally to the rear wall 9 of the piston element 5 and likewise has a cylindrical shape. Here, the coupling element 6 is provided with a hard coating and is surrounded by a stuffing box packing 12. The stuffing box packing 12 comprises rings and bushings consisting of graphite and stainless steel. In the region of the stuffing box packing 12, the stationary element 2 has an injection channel which makes it possible for graphite paste to be injected. In an emergency, this allows temporary sealing until a repair can take place.

The coupling element 5 is connected releasably to an electromechanical drive 14 which can move the movable element 3 within the stationary element 2 in a translational manner from left to right and back. Here, the connection takes place in a positively locking manner via an indentation 16 on the coupling element 6 and a corresponding counterpart on the electromechanical drive 14.

The fluid flow control element can be used in the case of new turbomachine systems, but can also be integrated, for example, into existing systems within the context of an upgrade. The simple maintenance which, for example, permits a simple replacement of the electromechanical drive 14 during operation also makes repair work on new and existing systems particularly simple, and also increases the overall safety of the plants. Thus, in the case of damage, one does not have to wait until the turbomachine system is shut down or even until the next maintenance cycle, but rather the flexible replacement in a very short time makes the elimination of damage of this type without further delay possible. Low pressure hydraulic drives, for example, can also be repaired in an at least simplified manner, since a central high pressure hydraulic circuit is no longer required for operation. Rather, a separate low pressure hydraulic system can be used which no longer makes the shutdown of other constituent parts necessary, but rather can also be switched off separately and repaired.

Here, within the context of a corresponding upgrade, at least one part of the fluid flow control element, in particular the existing valve arrangement and the existing drive, is simply swapped, it being possible for an existing feed line of a high pressure hydraulic system to be shut down. Subsequently, a direct regulation can take place via existing or new control electronics and, in the case of damage, a repair can be directly performed independently of a high pressure hydraulic system which is possibly still present in the rest of the turbomachine system. In particular, the swapping of the existing drive for an electromechanical drive 14 proves advantageous, since, for example, an oil-based hydraulic circuit can be dispensed with completely here, which oil-based hydraulic circuit entails additional requirements, safety risks and a greater space requirement.

Figure 2:
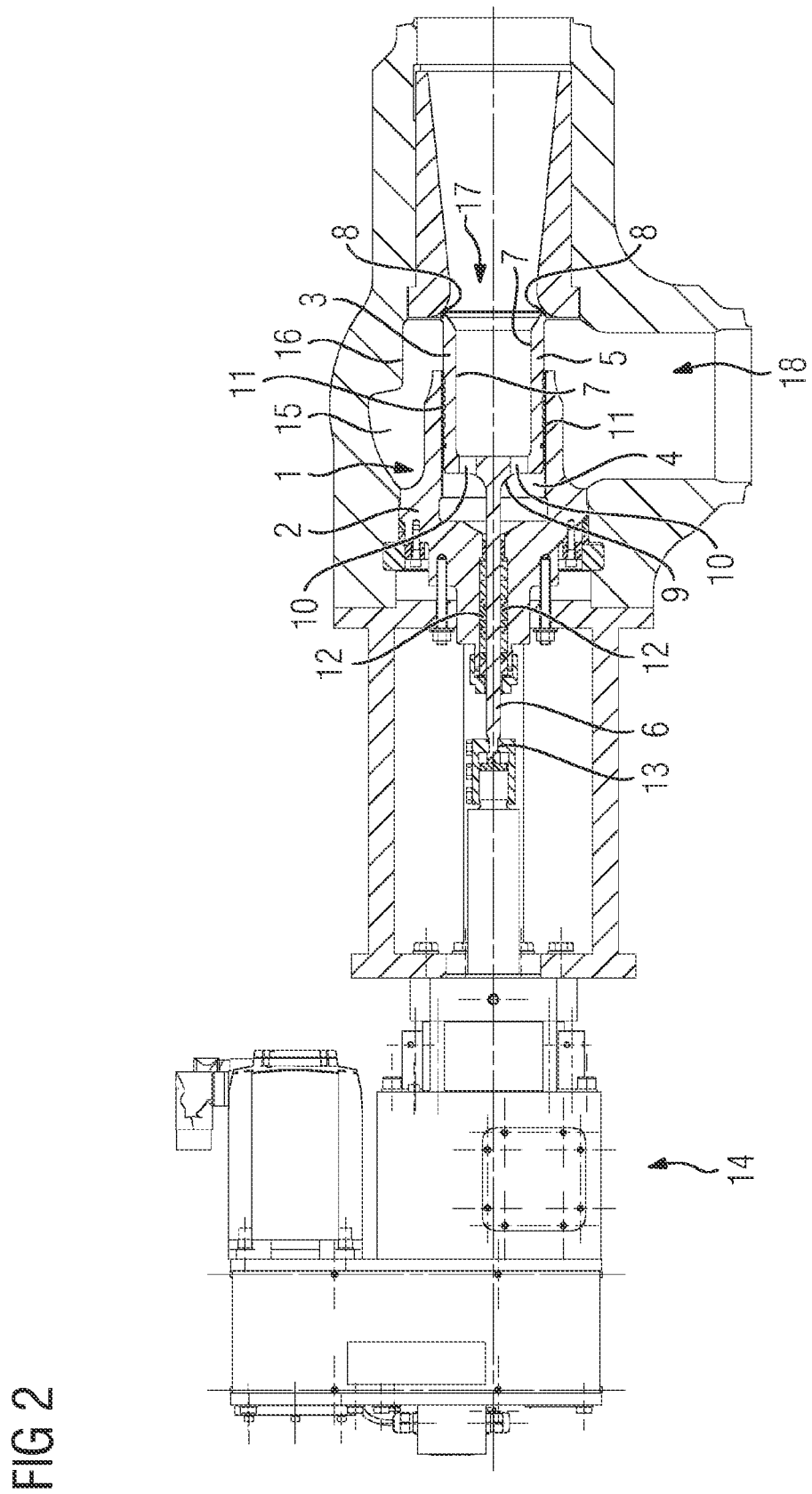
FIG. 2 shows a diagrammatic cross section of the fluid flow control element according to the invention which is illustrated in FIG. 1, as a 3D view.

FIG. 2 shows a diagrammatic cross section of the fluid flow control element according to the invention which is illustrated in FIG. 1, as a 3D view.

FIG. 3 shows a diagrammatic cross section of a similar fluid flow control element with a customary valve arrangement 1' as a side view. Here, the fluid flow control element also has an indentation 16' in the piston space 15', in order to provide comparable conditions with respect to the fluid flow control element according to the invention. In a deviation, however, the customary valve arrangement 1' is used that, by means of a drive 14' based on a high pressure hydraulic system, moves the movable element 3' within the stationary element 2' in a translational manner along the first axis and presses it onto the valve seat. Here, in particular for the opening of the fluid flow inlet opening 17', a great force is required which makes the high pressure hydraulic system necessary.

In an analogous manner with respect to the case which is illustrated in FIG. 1, the fluid flow control element is a constituent part of the fluid flow line 18' which is in turn a constituent part of a steam turbine system as one example of a turbomachine system. Here, the fluid flow control element is situated in the region of the fluid flow line 18' between the steam generator and the steam turbine.

For explanatory purposes, the present invention has been described in greater detail on the basis of exemplary embodiments. The invention is not to be restricted, however, to the specific configuration of said exemplary embodiments. Rather, the scope of protection of the invention is to be restricted merely by way of the appended claims.

The invention claimed is:
1. A valve arrangement for regulation of a fluid flow comprising:
   a stationary element and a movable element,
   wherein the stationary element comprises a cavity, in which the movable element moves,
   wherein the movable element is moveable translationally along a first axis within the cavity of the stationary element,
   wherein the movable element comprises a piston element and a rod-shaped coupling element,
   wherein the piston element comprises an outer side parallel to the first axis, the valve arrangement being designed in such a way that a throughflow of the fluid flow between the stationary element and the outer side of the piston element is prevented,
   wherein the piston element comprises a contact edge which is suitable for making contact with a valve seat,
   wherein the piston element comprises a rear side opposite the contact edge,
   wherein the coupling element is fastened to the rear side of the piston element,
   wherein the contact edge is rounded and is suitable for providing a linear contact with the valve seat,
   wherein the contact edge is situated on a thickened portion of the piston element, and
   wherein an inner diameter of the valve seat increases toward the piston body to form a convex rounded valve seat surface, and wherein the valve arrangement is configured to cause the contact edge to selectively abut the convex rounded seat surface to prevent the throughflow.
2. The valve arrangement as claimed in claim 1,
   wherein the rear side comprises at least one passage, the at least one passage connecting a region behind the rear side and an opposite region within the contact edge.
3. The valve arrangement as claimed in claim 1,
   wherein the piston element comprises a pot shape which is open on the side of the contact edge,
   wherein the piston element comprises a rear wall opposite the contact edge, the rear wall having at least one passage.
4. The valve arrangement as claimed in claim 1,
   wherein the outer side of the piston element comprises at least one seal.
5. The valve arrangement as claimed in claim 4,
   wherein the at least one seal is selected from the group consisting of labyrinth seals, piston rings and brush seals.
6. A fluid flow control element, comprising:
   the valve arrangement as claimed in claim 1,
   a fluid flow line and a fluid flow inlet opening comprising the valve seat within the fluid flow line,
   wherein the valve seat is suitable for making the contact with the contact edge of the valve arrangement.
7. The fluid flow control element as claimed in claim 6,
   wherein the fluid flow line comprises a piston space in a region of the valve arrangement,
   wherein the piston space comprises an indentation,
   wherein the indentation extends in the direction of the movable element.
8. The fluid flow control element as claimed in claim 6, further comprising:
   an electromechanical drive which is connected releasably or non-releasably to the coupling element of the movable element, and
   wherein the electromechanical drive is suitable for moving the movable element along the first axis.
9. A turbomachine system, comprising:
   the valve arrangement as claimed in claim 1, and
   a fluid flow control element comprising a fluid flow line and a fluid flow inlet opening comprising the valve seat within the fluid flow line, wherein the valve seat is suitable for making the contact with the contact edge of the valve arrangement.
10. The turbomachine system as claimed in claim 9,
    wherein the turbomachine system comprises a steam turbine system, and
    wherein the valve arrangement and/or the fluid flow control element is arranged in a steam line between a steam generator and a turbine of the steam turbine system.
11. The valve arrangement as claimed in claim 1,
    wherein the piston element comprises a piston body comprising the outer side, the rear side, the thickened portion, and the contact edge, and
    wherein the contact edge is configured to make direct contact with the valve seat.
12. The valve arrangement of claim 11, wherein the contact edge is rounded.
13. The valve arrangement of claim 1, wherein once the contact edge abuts the convex rounded valve seat surface, further axial movement of the piston element toward the stationary element is prevented by physical interference therebetween.
14. The valve arrangement of claim 1, wherein the contact edge contacts the valve seat between a relatively small inner diameter of the valve seat and a relatively large inner diameter of the valve seat in a location that is set apart from the relatively small inner diameter.
15. A method for providing or repairing a turbomachine system comprising:
    a valve arrangement, the valve arrangement comprising: a stationary element and a movable element, wherein the stationary element comprises a cavity, in which the movable element moves, wherein the movable element is moveable translationally along a first axis within the cavity of the stationary element, wherein the movable element comprises a piston element and a rod-shaped coupling element, wherein the piston element comprises an outer side parallel to the first axis, the valve arrangement being designed in such a way that a throughflow of a fluid flow between the stationary element and the outer side of the piston element is prevented, wherein the piston element comprises a contact edge which is suitable for making contact with a valve seat, wherein the piston element comprises a rear side opposite the contact edge, wherein the coupling element is fastened to the rear side of the piston element, wherein the contact edge is rounded and is suitable for providing a linear contact with the valve seat, wherein the contact edge is situated on a thickened portion of the piston element, wherein an inner diameter of the valve seat increases toward the piston body to form a convex rounded valve seat surface, and wherein the valve arrangement is configured to cause the contact edge to selectively abut the convex rounded seat surface to prevent the throughflow; and
    a fluid flow control element comprising a fluid flow line and a fluid flow inlet opening comprising the valve seat within the fluid flow line, wherein the valve seat is suitable for making the contact with the contact edge of the valve arrangement;

the method comprising:
  installing or repairing the valve arrangement or the fluid flow control element.

16. The method as claimed in claim 15, further comprising:
  at least partially replacing of an existing fluid flow control element comprising a high pressure hydraulic drive for the provision of the fluid flow control element comprising a low pressure hydraulic drive or an electromechanical drive.

17. The method as claimed in claim 15, further comprising:
  at least partially replacing of an existing fluid flow control element comprising a non-electromechanical drive with the fluid flow control element comprising an electromechanical drive.

18. A method for regulation of a fluid flow of a turbomachine system, or a steam turbine system, the method comprising:
  providing a valve arrangement, comprising: a stationary element and a movable element, wherein the stationary element comprises a cavity, in which the movable element moves, wherein the movable element is moveable translationally along a first axis within the cavity of the stationary element, wherein the movable element comprises a piston element and a rod-shaped coupling element, wherein the piston element comprises an outer side parallel to the first axis, the valve arrangement being designed in such a way that a throughflow of the fluid flow between the stationary element and the outer side of the piston element is prevented, wherein the piston element comprises a contact edge which is suitable for making contact with a valve seat, wherein the piston element comprises a rear side opposite the contact edge, wherein the coupling element is fastened to the rear side of the piston element, wherein the contact edge is rounded and is suitable for providing a linear contact with the valve seat, wherein the contact edge is situated on a thickened portion of the piston element, wherein an inner diameter of the valve seat increases toward the piston body to form a convex rounded valve seat surface, and wherein the valve arrangement is configured to cause the contact edge to selectively abut the convex rounded seat surface to prevent the throughflow, and
  regulating the fluid flow with a fluid flow control element comprising a fluid flow line and a fluid flow inlet opening comprising the valve seat within the fluid flow line, wherein the valve seat is suitable for making the contact with the contact edge of the valve arrangement.

* * * * *